United States Patent
Cozza et al.

(10) Patent No.: US 11,503,756 B2
(45) Date of Patent: Nov. 22, 2022

(54) SYSTEM AND METHOD FOR DETERMINING SOIL LEVELNESS USING SPECTRAL ANALYSIS

(71) Applicant: CNH Industrial America LLC, New Holland, PA (US)

(72) Inventors: Michael R. Cozza, Pittsburgh, PA (US); Mircea F. Lupu, Pittsburgh, PA (US); Surya Saket Dasika, Pittsburgh, PA (US); Sai Raghavendra Prasad Poosa, Pittsburgh, PA (US); Thamer Z. Alharbi, Naperville, IL (US)

(73) Assignee: CNH Industrial America LLC, New Holland, PA (US)

( * ) Notice: Subject to any disclaimer, the term of this patent is extended or adjusted under 35 U.S.C. 154(b) by 547 days.

(21) Appl. No.: 16/582,646

(22) Filed: Sep. 25, 2019

(65) Prior Publication Data

US 2021/0084805 A1 Mar. 25, 2021

(51) Int. Cl.
*A01B 79/00* (2006.01)
*A01B 63/24* (2006.01)
(Continued)

(52) U.S. Cl.
CPC .......... *A01B 79/005* (2013.01); *A01B 63/24* (2013.01); *G01B 11/24* (2013.01); *G01S 17/88* (2013.01)

(58) Field of Classification Search
CPC ....... A01B 79/005; A01B 63/24; G01B 11/24; G01S 17/88
See application file for complete search history.

(56) References Cited

U.S. PATENT DOCUMENTS

| | | | | |
|---|---|---|---|---|
| 6,070,539 A | * | 6/2000 | Flamme et al. ..... | A01M 7/0089 701/50 |
| 6,070,673 A | * | 6/2000 | Wendte ................. | G01C 21/20 701/50 |

(Continued)

FOREIGN PATENT DOCUMENTS

| | | |
|---|---|---|
| RO | 132289 | 12/2017 |
| WO | WO 2017049186 | 3/2017 |
| WO | WO2019079205 | 4/2019 |

OTHER PUBLICATIONS

The International Search Report and Written Opinion Corresponding to Application No. PCT/US20201052435 dated Dec. 21, 2020 (12 pages).

(Continued)

*Primary Examiner* — Tara Mayo-Pinnock
(74) *Attorney, Agent, or Firm* — Rebecca Henkel; Rickard DeMille

(57) ABSTRACT

In one aspect, a system for determining soil levelness as an agricultural implement is being towed across a field by a work vehicle may include a vision-based sensor configured to capture vision data associated with a portion of the field present within a field of view of the vision-based sensor. A controller of the system may be configured to receive, from the vision-based sensor, the vision data associated with the portion of the field present within the field of view of the vision-based sensor. Additionally, the controller may be configured to determine a soil levelness of the portion of the field present within the field of view of the vision-based sensor based on a spectral analysis of the received vision data.

20 Claims, 5 Drawing Sheets

(51) Int. Cl.
*G01B 11/24* (2006.01)
*G01S 17/88* (2006.01)

(56) References Cited

U.S. PATENT DOCUMENTS

| | | |
|---|---|---|
| 6,608,672 B1 | 8/2003 | Shibusawa et al. |
| 9,026,321 B2 | 5/2015 | Henry et al. |
| 9,554,098 B2 | 1/2017 | Casper et al. |
| 9,983,311 B2 | 5/2018 | McPeek |
| 10,123,475 B2 | 11/2018 | Posselius et al. |
| 10,172,289 B2 | 1/2019 | Briquet-Kerestedjian et al. |
| 10,255,670 B1 | 4/2019 | Wu et al. |
| 10,262,206 B2 | 4/2019 | Posselius |
| 2005/0055147 A1* | 3/2005 | Hrazdera et al. .... A01B 79/005 701/50 |
| 2016/0029547 A1 | 2/2016 | Casper et al. |
| 2017/0112043 A1 | 4/2017 | Nair et al. |
| 2017/0142900 A1 | 5/2017 | Mahieu et al. |
| 2017/0176595 A1* | 6/2017 | McPeek ............... G01C 21/165 |
| 2018/0206393 A1 | 7/2018 | Stoller et al. |
| 2018/0208058 A1* | 7/2018 | Czapka et al. ......... A01C 21/00 |
| 2018/0310474 A1 | 11/2018 | Posselius et al. |
| 2019/0059198 A1 | 2/2019 | Schnaider et al. |
| 2020/0278680 A1 | 9/2020 | Schulz et al. |

OTHER PUBLICATIONS

Foldager, Frederik F., "LiDAR—Based 3D Scans of Soil Surfaces and Furrows in Two Soil Types," Sensors, Feb. 6, 2019, 14 pages.
Huang, Chi-Hua, et al., "Portable Laser Scanner for Measuring Soil Surface Roughness," Soil Science Society of America Journal, vol. 54, No. 5, pp. 1402-1406, abstract only.
Milenkovic, Milutin, "Applying Terrestrial Laser Scanning for Soil Surface Roughness Assessment," Remote Sensing, 2015, vol. 7, Issue 2, 39 pages.

\* cited by examiner

SYSTEM AND METHOD FOR DETERMINING SOIL LEVELNESS USING SPECTRAL ANALYSIS

FIELD OF THE INVENTION

The present disclosure generally relates to systems and methods for determining soil levelness and, more particularly, to systems and methods for determining the soil levelness of a field across which an agricultural implement is being towed by a work vehicle using spectral analysis.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. Tillage implements typically include a plurality of ground engaging tools, such as harrow discs, shanks, leveling blades, tines, rolling baskets, and/or the like, which loosen and/or otherwise agitate the soil to prepare the soil for subsequent planting operations.

Upon completion of the tillage operation, it is generally desirable that the ridges and valleys present within the field have a predetermined height and depth, respectively. As such, systems have been developed that allow the soil levelness or surface profile of the field to be determined as the implement is traveling across the field. However, further improvements to such systems are needed. For example, such systems often require significant processing power and/or memory.

Accordingly, an improved system and method for determining soil levelness would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for determining soil levelness as an agricultural implement is being towed across a field by a work vehicle. The system may include a vision-based sensor provided in operative association with one of the work vehicle or the agricultural implement such that the vision-based sensor is configured to capture vision data associated with a portion of the field present within a field of view of the vision-based sensor. Furthermore, the system may include a controller communicatively coupled to the vision-based sensor, with the controller including a processor and associated memory. The memory may store instructions that, when implemented by the processor, configure the controller to receive, from the vision-based sensor, the vision data associated with the portion of the field present within the field of view of the vision-based sensor. Additionally, the memory may store instructions that, when implemented by the processor, configure the controller to determine a soil levelness of the portion of the field present within the field of view of the vision-based sensor based on a spectral analysis of the received vision data.

In another aspect, the present subject matter is directed to an agricultural implement. The agricultural implement may include a frame, a plurality of first ground engaging tools mounted on the frame, and a plurality of second ground engaging tool mounted on the frame aft of the plurality of first ground engaging tools relative to a direction of travel of the agricultural implement. Furthermore, the agricultural implement may include a vision-based sensor mounted on the frame such that the vision-based sensor is configured to capture vision data associated with a portion of the field present within a field of view of the vision-based sensor. Additionally, the agricultural implement may include a controller communicatively coupled to the vision-based sensor, with the controller including a processor and associated memory. The memory may store instructions that, when implemented by the processor, configure the controller to receive, from the vision-based sensor, the vision data associated with the portion of the field present within the field of view of the vision-based sensor. Moreover, the memory may store instructions that, when implemented by the processor, configure the controller to determine a soil levelness of the portion of the field present within the field of view of the vision-based sensor based on a spectral analysis of the received vision data. In addition, the memory may store instructions that, when implemented by the processor, configure the controller to actively adjust a force being applied to the plurality of second ground engaging tools based on the determined soil levelness.

In a further aspect, the present subject matter is directed to a method for determining soil levelness as an agricultural implement is being towed across a field by a work vehicle. The method may include receiving, with one or more computing devices, vision data associated with a portion of the field as the agricultural implement is being towed across the field by a work vehicle. Furthermore, the method may include determining, with the one or more computing devices, a soil levelness of the portion of the field based on a spectral analysis of the received vision data. Additionally, the method may include providing, with the one or more computing devices, a notification to an operator of at least one of the work vehicle or the agricultural implement associated with the determined soil levelness of the field.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
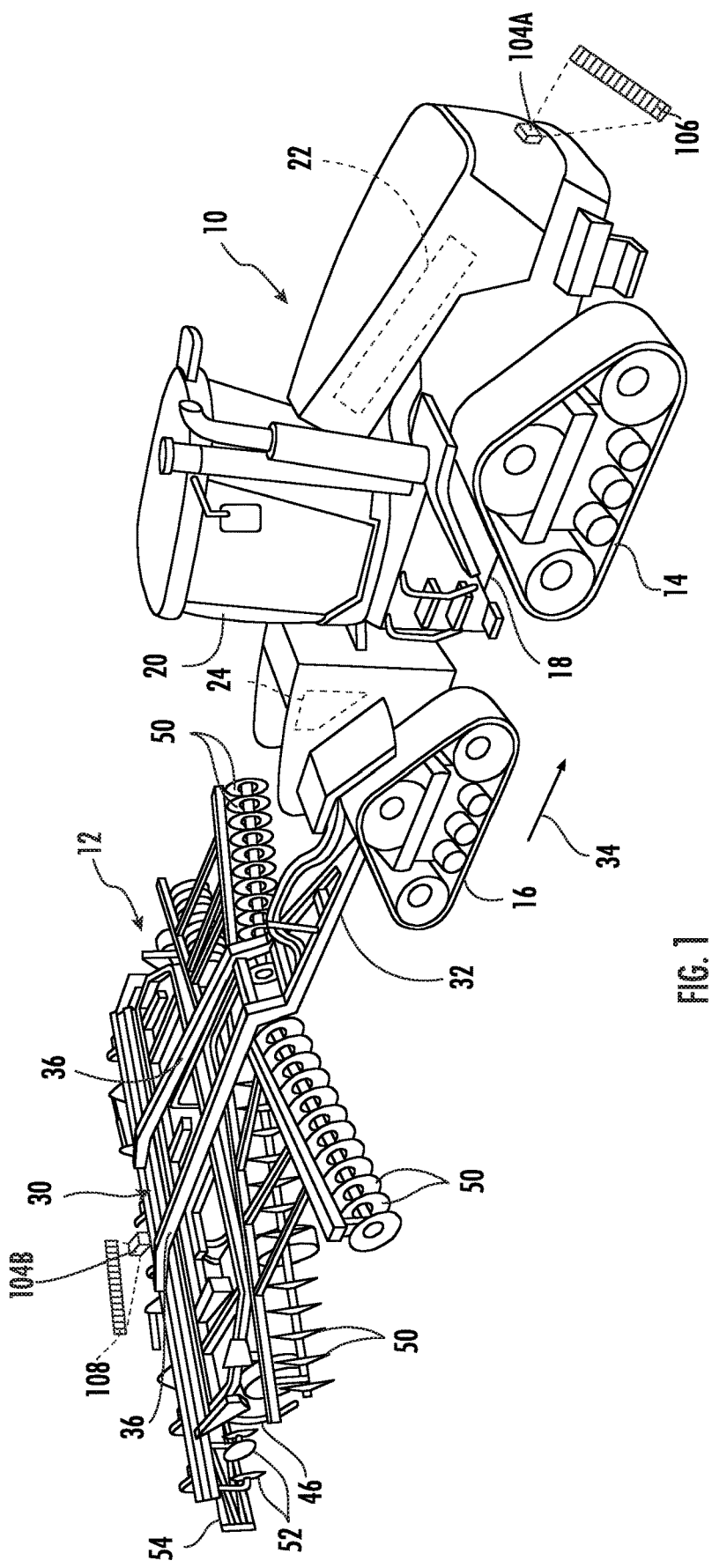
FIG. 1 illustrates a perspective view of one embodiment of a work vehicle towing an implement in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for determining soil levelness as an agricultural implement is being towed across a field by a work vehicle. Specifically, in several embodiments, one or more vision-based sensors (e.g., a LIDAR sensor(s)) may be provided in operative association with the work vehicle and/or the implement. In this regard, as the vehicle/implement travels across the field to perform an agricultural operation (e.g., a tillage operation) thereon, the vision-based sensor(s) may be configured to capture vision data of the field (e.g., a plurality of data point scan lines). The captured vision data may then be analyzed by an associated controller to determine the soil levelness of the portion(s) of the field present within the field(s) of view of the vision-based sensor(s). Thereafter, the controller may be configured to adjust one or more operating parameters of the vehicle and/or implement based on the determined soil levelness. For example, in one embodiment, the controller may be configured to initiate an adjustment in the penetration depth of and/or the force being applied to one or more leveling blades of the implement when the determined soil levelness falls outside of a predetermined range.

In accordance with aspects of the present subject matter, the controller may be configured to analyze the received vision data using spectral analysis (e.g., a Fourier transformation) to determine the soil levelness. In general, the received vision data may be in the spatial domain such that the data is indicative of the vertical profile of the soil surface of the field at various positions within the field. As such, in several embodiments, the controller may be configured to transform the vision data to the frequency domain. Thereafter, the controller may be configured to determine the amplitude of the transformed data at the frequency corresponding to the lateral spacing of a plurality of ground engaging tools (e.g., shanks) mounted on the agricultural implement. Such amplitude may, in turn, correspond to the height of the ridges or the depth of the valleys present in the portion of the field within the field(s) of view of the vision-based sensor(s), thereby providing an indication of soil levelness.

Thus, by using spectral analysis to determine the soil levelness of the field as the implement is towed across the field by a vehicle, the disclosed systems and methods require less processing power and memory.

Figure 2:
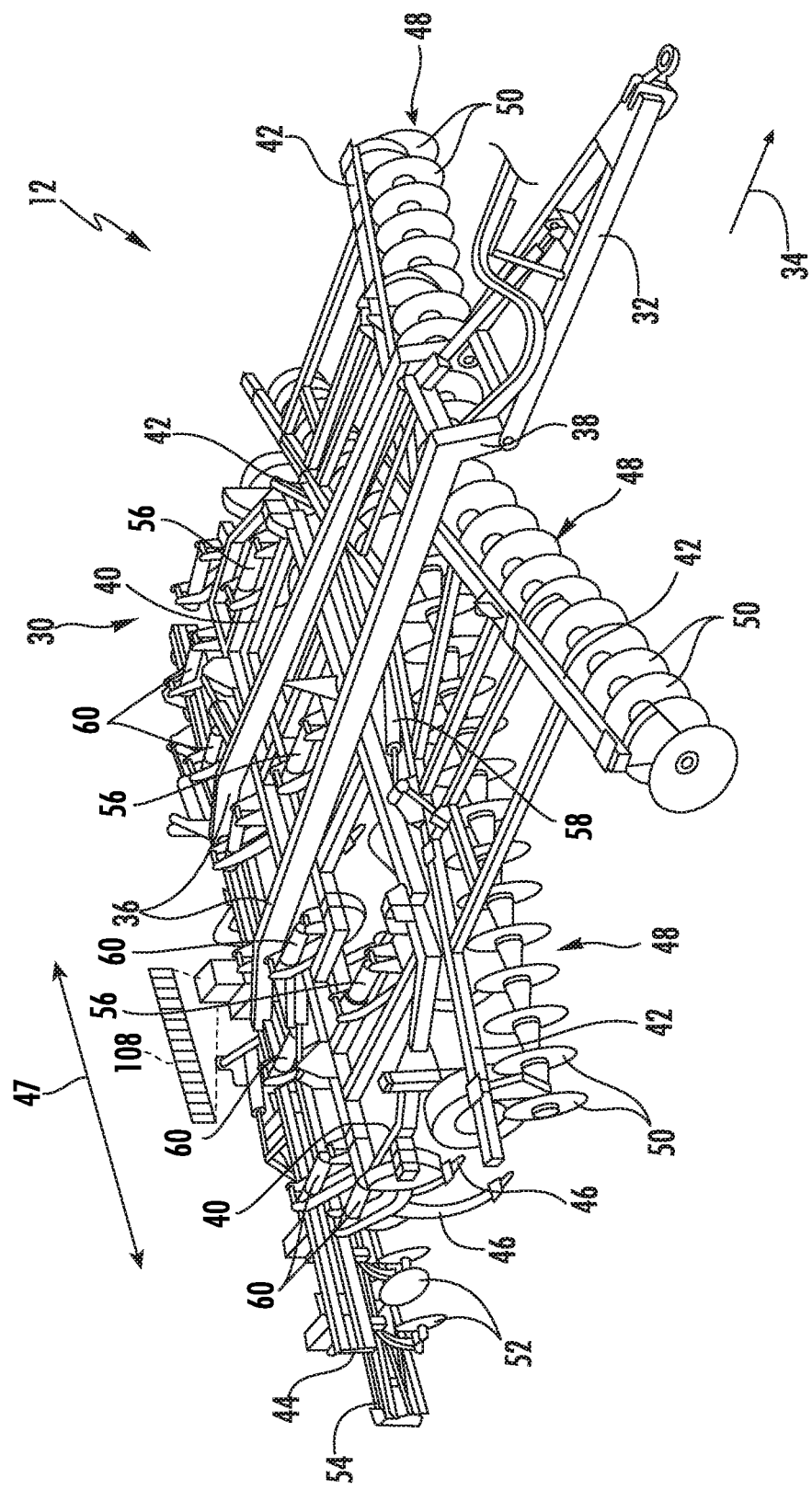
FIG. 2 illustrates a perspective view of the implement shown in FIG. 1.

Referring now to drawings, FIGS. 1 and 2 illustrate perspective views of one embodiment of a work vehicle 10 and an associated agricultural implement 12 in accordance with aspects of the present subject matter. Specifically, FIG. 1 illustrates a perspective view of the work vehicle 10 towing the implement 12 (e.g., across a field). Additionally, FIG. 2 illustrates a perspective view of the implement 12 shown in FIG. 1. As shown in the illustrated embodiment, the work vehicle 10 is configured as an agricultural tractor and the implement 12 is configured as a tillage implement. However, in other embodiments, the work vehicle 10 may be configured as any other suitable agricultural vehicle. Furthermore, in alternative embodiments, the implement 12 may be configured as any other suitable agricultural implement.

As particularly shown in FIG. 1, the work vehicle 10 includes a pair of front track assemblies 14 (one is shown), a pair of rear track assemblies 16 (one is shown), and a frame or chassis 18 coupled to and supported by the track assemblies 14, 16. An operator's cab 20 may be supported by a portion of the chassis 18 and may house various input devices for permitting an operator to control the operation of one or more components of the work vehicle 10 and/or one or more components of the implement 12. Additionally, the work vehicle 10 may include an engine 22 and a transmission 24 mounted on the chassis 18. The transmission 24 may be operably coupled to the engine 22 and may provide variably adjusted gear ratios for transferring engine power to the track assemblies 14, 16 via a drive axle assembly (not shown) (or via axles if multiple drive axles are employed).

Moreover, as shown in FIGS. 1 and 2, the implement 12 may generally include a carriage frame assembly 30 configured to be towed by the work vehicle 10 via a pull hitch or tow bar 32 in a travel direction of the vehicle (e.g., as indicated by arrow 34). In general, the carriage frame assembly 30 may be configured to support a plurality of ground-engaging tools, such as a plurality of shanks, disk blades, leveling blades, basket assemblies, and/or the like. In several embodiments, the various ground-engaging tools may be configured to perform a tillage operation across the field along which the implement 12 is being towed.

As particularly shown in FIG. 2, the carriage frame assembly 30 may include aft-extending carrier frame members 36 coupled to the tow bar 32. In addition, reinforcing gusset plates 38 may be used to strengthen the connection between the tow bar 32 and the carrier frame members 36. In several embodiments, the carriage frame assembly 30 may generally support a central frame 40, a forward frame 42 positioned forward of the central frame 40 in the direction of travel 34, and an aft frame 44 positioned aft of the central frame 40 in the direction of travel 34. As shown in FIG. 2, in one embodiment, the central frame 40 may correspond to a shank frame configured to support a plurality of ground-engaging shanks 46 configured to till the soil as the implement 12 is towed across the field. In such an embodiment, the shanks 46 may be spaced apart from each other in a lateral direction (e.g., as indicated by arrow 47 in FIG. 2) of the implement 12, with the lateral direction 47 extending perpendicular to the direction of travel 34. However, in other embodiments, the central frame 40 may be configured to support any other suitable ground-engaging tools.

Additionally, as shown in FIG. 2, in one embodiment, the forward frame 42 may correspond to a disk frame configured to support various gangs or sets 48 of disk blades 50. In such an embodiment, each disk blade 50 may, for example, include both a concave side (not shown) and a convex side (not shown). In addition, the various gangs 48 of disk blades 50 may be oriented at an angle relative to the travel direction 34 of the work vehicle 10 to promote more effective tilling of the soil. However, in other embodiments, the forward frame 42 may be configured to support any other suitable ground-engaging tools.

Moreover, like the central and forward frames 40, 42, the aft frame 44 may also be configured to support a plurality of ground-engaging tools. For instance, in the illustrated embodiment, the aft frame 44 is configured to support a plurality of leveling blades 52 and rolling (or crumbler) basket assemblies 54 positioned aft of the shanks 46. In such an embodiment, the leveling blades 52 may be spaced apart from each other in the lateral direction 47 of the implement 12. Moreover, the leveling blades 52 may be staggered relative to the shanks 46 in the lateral direction 47. That is, each leveling blade 52 may be positioned between a pair of adjacent shanks 46 in the lateral direction 47. However, in other embodiments, any other suitable ground-engaging tools may be coupled to and supported by the aft frame 44, such as a plurality closing disks.

In addition, the implement 12 may also include any number of suitable actuators (e.g., hydraulic cylinders) for adjusting the relative positioning of, penetration depth of, and/or force applied to the various ground-engaging tools 46, 50, 52, 54. For instance, the implement 12 may include one or more first actuators 56 coupled to the central frame 40 for raising or lowering the central frame 40 relative to the ground, thereby allowing adjustment of the penetration depth of and/or the forced applied to the shanks 46. Similarly, the implement 12 may include one or more second actuators 58 coupled to the disk forward frame 42 to adjust the penetration depth of and/or the force applied to the disk blades 50. Moreover, the implement 12 may include one or more third actuators 60 coupled to the aft frame 44 to allow the aft frame 44 to be moved relative to the central frame 40, thereby allowing the relevant operating parameters of the ground-engaging tools 52, 54 supported by the aft frame 44 (e.g., the force applied to and/or the penetration depth of) to be adjusted.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration. For example, in an alternative embodiment, a separate frame or chassis may be provided to which the engine, transmission, and drive axle assembly are coupled, a configuration common in smaller tractors. Still other configurations may use an articulated chassis to steer the work vehicle 10 or rely on tires/wheels in lieu of the track assemblies 14, 16.

It should also be appreciated that the configuration of the implement 12 described above and shown in FIGS. 1 and 2 is only provided for exemplary purposes. Thus, it should be appreciated that the present subject matter may be readily adaptable to any manner of implement configuration. For example, as indicated above, each frame section of the implement 12 may be configured to support any suitable type of ground-engaging tools, such as by installing closing disks on the aft frame 44 of the implement 12.

Additionally, in accordance with aspects of the present subject matter, the work vehicle 10 and/or the implement 12 may include one or more vision-based sensors coupled thereto and/or supported thereon for capturing vision data associated with the field as an operation is being performed via the implement 12. Specifically, in several embodiments, the vision-based sensor(s) may be provided in operative association with the work vehicle 10 and/or the implement 12 such that the vision-based sensor(s) has a field of view directed towards a portion(s) of the field disposed in front of, behind, and/or along one or both of the sides of the work vehicle 10 and/or the implement 12 as the implement 12 is being towed across the field. As such, the vision-based sensor(s) may capture vision data from the vehicle 10 and/or implement 12 of one or more portion(s) of the field being passed by the vehicle 10 and/or implement 12.

In general, the vision-based sensor(s) may correspond to any suitable device(s) configured to capture vision data of the soil surface of the field that allows the profile of the top surface of the field to be identified. For instance, in several embodiments, the vision-based sensor(s) may correspond to a Light Detection and Ranging ("LIDAR") device(s), such as a LIDAR scanner(s). In such embodiments, the vision-based sensor(s) may be configured to output light pulses from a light source (e.g., a laser outputting a pulsed laser beam) and detect the reflection of each pulse off the soil surface. Based on the time of flight of the light pulses, the specific location (e.g., 2-D or 3-D coordinates) of the soil surface relative to the vision-based sensor(s) may be calculated. By scanning the pulsed light over a given swath width, the profile of the soil surface may be detected across a given section of the field. Thus, by continuously scanning the pulsed light along the soil surface as the work vehicle 10 and the implement 12 are moved across the field, a plurality of data point scan lines may be generated that includes soil surface profile data for all or a portion of the field. Alternatively, the vision-based sensor(s) may correspond to any other suitable vision system(s) capable of capturing vision or image-like data that allows the soil surface profile of the field to be identified. For example, in one embodiment, the vision-based sensor(s) may correspond to a camera(s).

In several embodiments, two or more vision-based sensors may be provided in operative association with the work vehicle 10 and/or the implement 12. For instance, as shown in FIGS. 1 and 2, in one embodiment, a first vision-based sensor 104A may be coupled to the front of the work vehicle 10 such that the vision-based sensor 104A has a field of view 106 that allows it to capture vision data of an adjacent area or portion of the field disposed in front of the work vehicle 10. Similarly, as shown in FIGS. 1 and 2, a second vision-based sensor 104B may be coupled to the rear of the implement 12 such that the vision-based sensor 104B has a field of view 108 that allows it to capture vision data of an adjacent area or portion of the field disposed aft of the implement 12.

It should be appreciated that, in alternative embodiments, the vision-based sensor(s) 104A, 104B may be installed at any other suitable location(s) that allows the vision-based sensor(s) 104A, 104B to capture vision data of the field across which the vehicle/implement 10/12. For example, as an alternative to positioning the first vision-based sensor 104A at the front of the vehicle 10, such vision-based sensor 104A may be coupled to one of the sides of the work vehicle 10 or the implement 12 such that the vision-based sensor 104A has a field of view 106 that allows it to capture vision data of an adjacent area or portion of the field disposed along such side of the work vehicle 10 or the implement 12. Moreover, as an alternative to positioning the second vision-based sensor 104B at the rear of the implement 12, such vision-based sensor 104B may be coupled to other of the sides of the work vehicle 10 or the implement 12 such that the vision-based sensor 104B has a field of view 108 that allows it to capture vision data of an adjacent area or portion of the field disposed along such side of the work vehicle 10 or the implement 12. However, in alternative embodiments, the vision-based sensor(s) 104A, 104B may be mounted at any other suitable location(s) on the vehicle 10 and/or the implement 12.

Additionally, it should be appreciated that, although the embodiments shown in FIGS. 1 and 2 illustrate two vision-based sensors 104A, 104B installed on the work vehicle 10 and/or the implement 12, a single vision-based sensor may be installed relative to the work vehicle 10 and/or the implement 12 to allow vision data of the field to be captured. For instance, in one embodiment, it may be desirable to only have a single vision-based sensor that captures vision data either before or after the agricultural operation is performed. Alternatively, a single vision-based sensor may be used to capture vision data both before and after the agricultural operation is performed. For instance, by making a second pass across the same portion of the field or by mounting the vision-based sensor along the side of the work vehicle 10 or the implement 12, before and after vision data for same section of the field may be captured using a single vision-based sensor. Furthermore, in other embodiments, more than two vision-based sensors may be installed relative to the work vehicle 10 and/or the implement 12 to allow vision data for the field to be captured.

Figure 3:
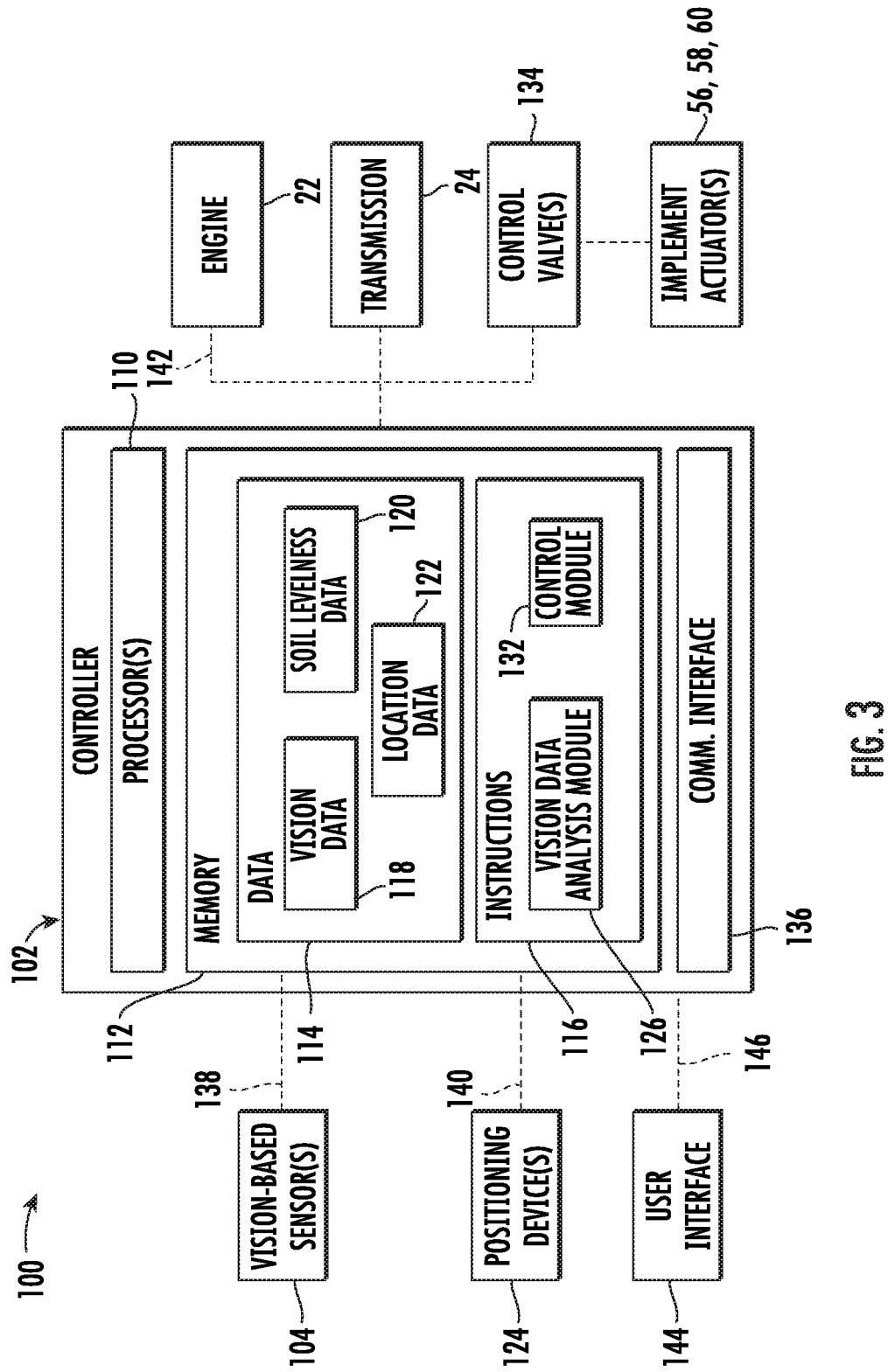
FIG. 3 illustrates a schematic view of one embodiment of a system for determining soil levelness in accordance with aspects of the present subject matter.

Referring now to FIG. 3, a schematic view of one embodiment of a system 100 for determining soil levelness is illustrated in accordance with aspects of the present subject matter. In general, the system 100 will be described herein with reference to the work vehicle 10 and the implement 12 described above with reference to FIGS. 1 and 2. However, it should be appreciated by those of ordinary skill in the art that the disclosed system 100 may generally be utilized with work vehicles having any other suitable vehicle configuration and/or implements having any other suitable implement configuration.

In several embodiments, the system 100 may include a controller 102 and various other components configured to be communicatively coupled to and/or controlled by the controller 102, such as one or more vision-based sensors 104 and/or various components of the work vehicle 10 and/or the implement 12. As will be described in greater detail below, the controller 102 may be configured to receive vision data from the vision-based sensor(s) 104 depicting portions of the field as an operation (e.g., a tillage operation) is being performed within the field. For example, as described above, such vision data may correspond to a plurality of data point scan lines associated with the soil surface profile of the field. Thereafter, the controller 102 may be configured to analyze the received vision data using spectral analysis to estimate or determine the soil levelness of the field. Moreover, based on the analysis of the vision data, the controller 102 may also be configured to adjust the operation of the work vehicle 10 and/or the implement 12, as necessary, to ensure that the soil levelness of the field is maintained at a given target value and/or within a given target range.

In general, the controller 102 may correspond to any suitable processor-based device(s), such as a computing device or any combination of computing devices. Thus, as shown in FIG. 3, the controller 102 may generally include one or more processor(s) 110 and associated memory devices 112 configured to perform a variety of computer-implemented functions (e.g., performing the methods, steps, algorithms, calculations, and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 112 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 112 may generally be configured to store information accessible to the processor(s) 110, including data 114 that can be retrieved, manipulated, created and/or stored by the processor(s) 110 and instructions 116 that can be executed by the processor(s) 110.

In several embodiments, the data 114 may be stored in one or more databases. For example, the memory 112 may include a vision database 118 for storing vision data received from the vision-based sensor(s) 104. For example, the vision-based sensor(s) 104 may be configured to continuously or periodically capture vision data (e.g., data point scan lines) of adjacent portion(s) of the field as an agricultural operation is being performed on the field. In such an embodiment, the vision data transmitted to the controller 102 from the vision-based sensor(s) 104 may be stored within the vision database 118 for subsequent processing and/or analysis. It should be appreciated that, as used herein, the term vision data may include any suitable type of data received from the vision-based sensor(s) 104 that allows for the profile of the soil surface of a field to be analyzed, including data point scan lines/LIDAR scan data and other vision-based or image-like data (e.g., photographs).

Additionally, as shown in FIG. 3, the memory 112 may include a soil levelness database 120 for storing information related to the soil levelness of the field being processed. For example, as indicated above, based on the vision data received from the imaging device(s) 104, the controller 102 may be configured to estimate or determine the soil levelness of the field using spectral analysis (e.g., a Fourier transformation). The soil levelness estimated or determined by the controller 102 may then be stored within the soil levelness database 120 for subsequent processing and/or analysis.

Moreover, in several embodiments, the memory 112 may also include a location database 122 storing location information about the work vehicle/implement 10/12 and/or information about the field being processed (e.g., a field map). Specifically, as shown in FIG. 3, the controller 102 may be communicatively coupled to a positioning device(s) 124 installed on or within the work vehicle 10 and/or on or within the implement 12. For example, in one embodiment, the positioning device(s) 124 may be configured to determine the current location of the work vehicle 10 and/or the implement 12 using a satellite navigation position system (e.g. a GPS system, a Galileo positioning system, the Global Navigation satellite system (GLONASS), the BeiDou Satellite Navigation and Positioning system, and/or the like). In such an embodiment, the location determined by the positioning device(s) 124 may be transmitted to the controller 102 (e.g., in the form coordinates) and subsequently stored within the location database 122 for subsequent processing and/or analysis.

Additionally, in several embodiments, the location data stored within the location database 122 may also be correlated to the vision data stored within the vision database 118. For instance, in one embodiment, the location coordinates derived from the positioning device(s) 124 and the vision data captured by the vision-based sensor(s) 104 may both be time-stamped. In such an embodiment, the time-stamped data may allow the vision data associated with a given swath or portion of the field captured by the vision-based sensor(s) 104 to be matched or correlated to a corresponding set of location coordinates received from the positioning device(s) 124, thereby allowing the precise location of such swath/portion of the field depicted within the vision data to be known (or at least capable of calculation) by the controller 102.

Moreover, by matching the vision data to a corresponding set of location coordinates, the controller 102 may also be configured to generate or update a corresponding field map associated with the field being processed. For example, in instances in which the controller 102 already includes a field map stored within its memory 112 that includes location coordinates associated with various points across the field, the soil levelness value(s) determined from the vision data captured by the vision-based sensor(s) 104 may be mapped or correlated to a given location within the field map. Alternatively, based on the location data and the associated vision data, the controller 102 may be configured to generate a field map for the field that includes the geo-located vision data associated therewith.

Figure 4:
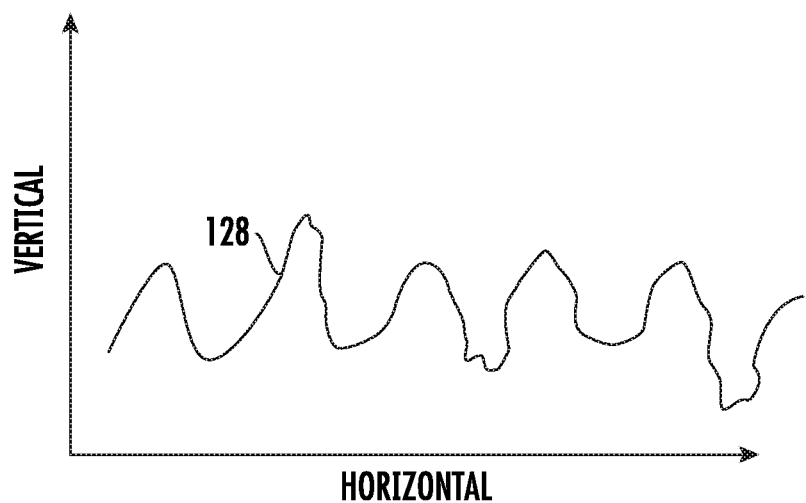
FIG. 4 illustrates an example data plot associated with vision data captured by the system disclosed in FIG. 3, particularly illustrating the captured vision data in the spatial domain.
Figure 5:
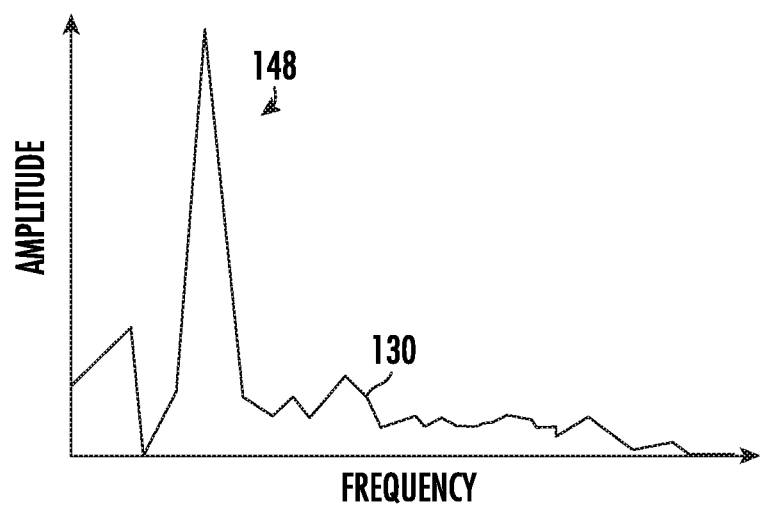
FIG. 5 illustrates another example data plot associated with vision data captured by the system disclosed in FIG. 3, particularly illustrating the captured vision data after such data has been transformed from the spatial domain to the frequency domain.

Referring still to FIG. 3, in several embodiments, the instructions 116 stored within the memory 112 of the controller 102 may be executed by the processor(s) 110 to implement a vision data analysis module 126. In general, the vision data analysis module 126 may be configured to analyze the vision data received from the vision-based sensor(s) 104 using one or more data analysis techniques to allow the controller 102 to estimate or determine the soil levelness of the field currently being processed. More specifically, the received vision data may generally be indicative of the vertical profile of the soil surface at various locations within the field. For example, FIG. 4 illustrates an example data plot generated from the received vision data. As shown, the example data plot depicts the 2-D vertical profile (e.g., as indicated by line 128 in FIG. 4) of the soil surface at various horizontal locations along a portion of the field. Thus, the received vision data may be in the spatial domain. As such, in several embodiments, the vision data analysis module 126 may be configured to implement one or more spectral analysis techniques to allow the controller 102 to transform the received vision data from the spatial domain to the frequency domain. For example, FIG. 5 illustrates an example data plot illustrating the vision data after such data has been transformed using the spectral analysis technique(s). As shown, the example data plot depicts the amplitude (e.g., as indicated by line 130) of the vision data at various frequencies. Furthermore, the vision data analysis module 126 may allow the controller 102 to estimate or determine the amplitude and/or phase of the transformed data at a frequency corresponding to the lateral spacing of a plurality of ground engaging tools (e.g., a row of the shanks 46) mounted on the implement 10. As will be described below, such frequency and/or phase of the transformed data may be indicative of the soil levelness of the field.

The vision data analysis module 126 may be configured to implement any suitable spectral analysis techniques that allow the controller 102 to determine the soil levelness of the field from the received vision data. Specifically, in several embodiments, the vision data analysis module 126 may be configured to implement a suitable Fourier transformation technique, such as a Fast Fourier transformation (FFT) technique. For example, suitable FFT techniques may include the Cooley-Tukey, Prime Factor, Braun's, Rader's, Bluestein's, and/or Hexagonal techniques. However, in alternative embodiments, the vision data analysis module 126 may be configured to implement any other suitable spectral analysis techniques, such as the Bartlett's, Welch's, and/or Least-squares techniques.

Referring again to FIG. 3, the instructions 116 stored within the memory 112 of the controller 102 may also be executed by the processor(s) 110 to implement a control module 132. In general, the control module 132 may be configured to adjust the operation of the work vehicle 10 and/or the implement 12 by controlling one or more components of the vehicle/implement 10, 12. Specifically, in several embodiments, the control module 132 may be configured to adjust one or more operating parameters of the vehicle 10 and/or the implement 12 based on the determined soil levelness of the field. For example, in one embodiment, when the soil levelness determined by the controller 102 falls outside of a predetermined soil levelness range, the control module 132 may be configured to fine-tune the operation of the work vehicle 10 and/or the implement 12 in a manner designed to adjust the height of the ridges and/or the depths of the valleys present within the field.

It should be appreciated that the controller 102 may be configured to implement various control actions to adjust the operation of the work vehicle 10 and/or the implement 12 in a manner that adjusts the soil levelness of the field. In one embodiment, the controller 102 may be configured to increase or decrease the operational or ground speed of the implement 12 to affect an adjustment in the soil levelness of the field. For instance, as shown in FIG. 3, the controller 102 may be communicatively coupled to both the engine 22 and the transmission 24 of the work vehicle 10. In such an embodiment, the controller 102 may be configured to adjust the operation of the engine 22 and/or the transmission 24 in a manner that increases or decreases the ground speed of the work vehicle 10 and, thus, the ground speed of the implement 12, such as by transmitting suitable control signals for controlling an engine or speed governor (not shown) associated with the engine 22 and/or transmitting suitable control signals for controlling the engagement/disengagement of one or more clutches (not shown) provided in operative association with the transmission 24.

In addition to the adjusting the ground speed of the vehicle/implement 10/12 (or as an alternative thereto), the controller 102 may also be configured to adjust one or more operating parameters associated with the ground-engaging tools of the implement 12 in a manner that adjusts the soil levelness of the field. For instance, as shown in FIG. 3, the controller 102 may be communicatively coupled to one or more valves 134 configured to regulate the supply of fluid (e.g., hydraulic fluid or air) to one or more corresponding actuators 56, 58, 60 of the implement 12. In such an embodiment, by regulating the supply of fluid to the actuator(s) 56, 58, 60, the controller 102 may automatically adjust the penetration depth of, the force applied to, and/or any other suitable operating parameter associated with the ground-engaging tools of the implement 12.

Moreover, as shown in FIG. 3, the controller 102 may also include a communications interface 136 to provide a means for the controller 102 to communicate with any of the various other system components described herein. For instance, one or more communicative links or interfaces 138 (e.g., one or more data buses) may be provided between the communications interface 136 and the vision-based sensor(s) 104 to allow vision data transmitted from the vision-based sensor(s) 104 to be received by the controller 102. Similarly, one or more communicative links or interfaces 140 (e.g., one or more data buses) may be provided between the communications interface 136 and the positioning device(s) 124 to allow the location information generated by the positioning device(s) 124 to be received by the controller 102. Additionally, as shown in FIG. 3, one or more communicative links or interfaces 142 (e.g., one or more data buses) may be provided between the communications interface 136 and the engine 22, the transmission 24, the control valves 138, and/or the like to allow the controller 102 to control the operation of such system components.

Furthermore, in one embodiment, the system 100 may also include a user interface 144. More specifically, the user interface 144 may be configured to provide feedback (e.g., feedback associated with the soil levelness of the field) to the operator of the vehicle/implement 10/12. As such, the user interface 144 may include one or more feedback devices (not shown), such as display screens, speakers, warning lights, and/or the like, which are configured to provide feedback from the controller 102 to the operator. The user interface 144 may, in turn, be communicatively coupled to the controller 102 via a communicative link or interface 146 to permit the feedback to be transmitted from the controller 102 to the user interface 144. In addition, some embodiments of the user interface 144 may include one or more input devices (not shown), such as touchscreens, keypads, touchpads, knobs, buttons, sliders, switches, mice, microphones, and/or the like, which are configured to receive user inputs from the operator. In one embodiment, the user interface 144 may be mounted or otherwise positioned within the cab 20 of the vehicle 10. However, in alternative embodiments, the user interface 144 may mounted at any other suitable location.

Figure 6:
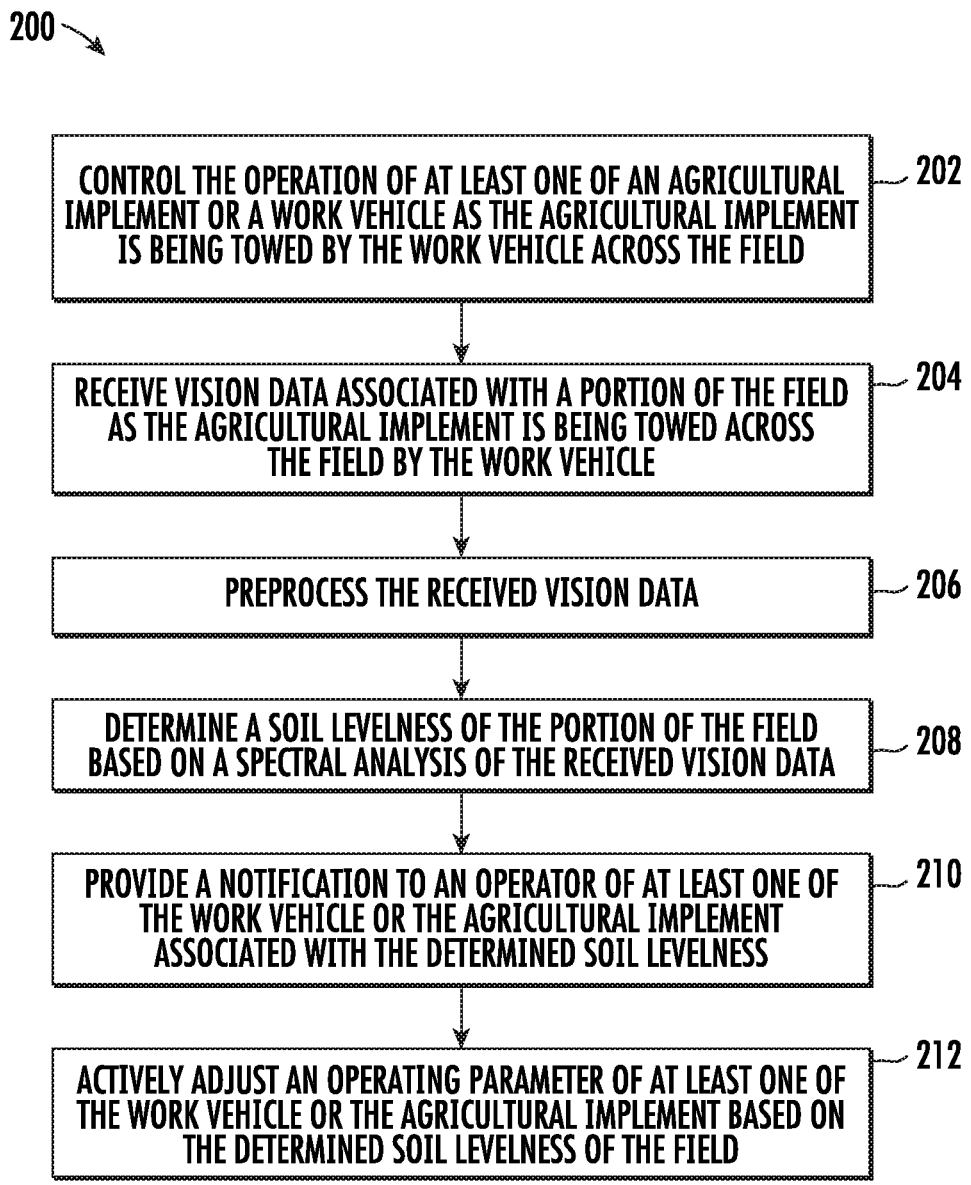
FIG. 6 illustrates a flow diagram of one embodiment of a method for determining soil levelness in accordance with aspects of the present subject matter.

Referring now to FIG. 6, a flow diagram of one embodiment of a method 200 for determining soil levelness is illustrated in accordance with aspects of the present subject matter. In general, the method 200 will be described herein with reference to the agricultural work vehicle 10 and implement 12 shown in FIGS. 1 and 2, as well as the various system components shown in FIGS. 3-5. However, it should be appreciated that the disclosed method 200 may be implemented with work vehicles having any other suitable vehicle configuration, implements having any other suitable implement configuration, and/or within systems having any other suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (202), the method 200 may include controlling the operation of at least one of an agricultural implement or a work vehicle as the agricultural implement is being towed by the work vehicle across a field. Specifically, as indicated above, the controller 102 of the disclosed system 100 may be configured to control the operation of the work vehicle 10 and/or the implement 12, such as by controlling one or more components of the vehicle 10 and/or one or more components of the implement 12 to allow an agricultural operation (e.g., a tillage operation) to be performed within the field.

As described above, the implement 10 may include various ground engaging tools for use in performing the agricultural operation. More specifically, in several embodiments, the implement 10 may include a plurality of shanks 46 that are spaced apart from each other in the lateral direction 47 of the implement 10. Furthermore, the implement 10 may include a plurality of leveling blades 52 that are similarly spaced apart from each other in the lateral direction 47. Moreover, the leveling blades 52 may be staggered relative to the shanks 46 in the lateral direction 47 such that each leveling blade 52 is positioned between a pair of adjacent shanks 46 in the lateral direction 47. As the implement 10 is moved across the field to perform the agricultural operation, the shanks 46 are moved through the soil such that each shank 46 forms a valley. As such, a ridge is formed in the field between each adjacent pair of shanks 46. In this respect, as the implement 10 is moved across the field, the leveling blades 52 are moved through the soil at the locations of the ridges, thereby flattening the ridges and filling in the valleys. After the shanks 46 and the leveling blades 52 have been moved through the soil, it is generally desirable that ridges be present where the shanks 46 engaged the soil and valleys be present where the leveling blades 52 engaged the soil. Moreover, it is desirable that such ridges and valleys have predetermined range of vertical heights and depths, respectively, such that the settling of the soil occurring before planting results in a generally flat or level field surface. When the vertical heights and depths of the ridges and valleys, respectively, fall outside of the predetermined range of vertical heights and depths, settling of the soil may result in an uneven field surface.

Furthermore, at (204), the method 200 may include receiving vision data associated with a portion of a field as an agricultural implement is being towed across the field by a work vehicle. As described above, the vehicle/implement 10/12 may include one or more vision-based sensor(s) 104 (e.g., a LIDAR sensor(s)), with each vision-based sensor 104 configured to capture vision data (e.g., data plurality of data point scan lines) of a portion of the field within its field of view 106/108. In this regard, as the vehicle/implement 10/12 travels across the field to perform an agricultural operation thereon (e.g., a tillage operation), the controller 102 may be configured to receive the captured vision data from the vision-based sensor(s) 104 (e.g., via the communicative link 138). As will be described below, the controller 102 may be configured to analyze the received vision data to determine the soil levelness of the field.

In some embodiments, the vision data received at (204) may be a plurality of data point scan lines (e.g., the vertical profile of a 2-D swath of the field associated with the scan line). Thus, in some embodiments, the method 200 may be performed iteratively for each new data scan line as such scan line is received. For example, method 200 may be performed iteratively in real-time as new data scan lines are received from the vision-based sensor(s) 104, while the vision-based sensor(s) 104 are moved throughout the field (e.g., as a result of being installed on the vehicle 10 or the implement 12). Alternatively, the vision data received at (202) may include a data point cloud associated with a 3-D portion of the field (e.g., from a vision-based sensor 102 capable of scanning a 3-D portion of the field).

Additionally, as shown in FIG. 6, at (206), the method 200 may include preprocessing the received vision data. Specifically, in several embodiments, the vision data analysis module 126 of the controller 102 may be configured to preprocess or otherwise precondition the received vision data. For example, such preprocessing may include removing outliers from the vision data, detrending the vision data, and/or the like. Moreover, in some embodiments, the preprocessing performed at (206) may be specific to the particular spectral analysis technique(s) being used. In addition, after such preprocessing, the vision data analysis module 126 of the controller 102 may be configured to average a plurality of successive data scan lines (e.g., twenty to fifty successive data scan lines) together to eliminate noise in the received vision data caused by the presence of soil clods scattered randomly on top of the field.

Moreover, at (208), the method 200 may include determining the soil levelness of the portion of the field based on a spectral analysis of the received vision data. Specifically, as indicated above, the vision data analysis module 126 of the controller 102 may, in accordance with aspects of the present subject matter, be configured to implement one or more suitable spectral analysis techniques (e.g., a Fourier transformation technique) that allow the controller 102 to determine the soil levelness of the field based on the received (and preprocessed) vision data. Specifically, in several embodiments, by implementing the spectral analysis technique(s), the controller 102 may be configured to transform the received vision data from the spatial domain to the frequency domain. Thereafter, the controller 102 may be configured to estimate or determine the amplitude and/or phase of the transformed data at a frequency corresponding to the lateral spacing of a plurality of ground engaging tools mounted on the implement 10. Such frequency and/or phase may, in turn, be indicative of the soil levelness of the field.

In general, the determined soil levelness of the field may correspond to any suitable parameter(s) or value(s) associated with the vertical soil profile of the field. Specifically, in one embodiment, the determined soil levelness of the field may correspond to the height (e.g., the average height) of the ridges present within the field. In another embodiment, the determined soil levelness of the field may correspond to the depth (e.g., the average depth) of the valleys present within the field. However, in alternative embodiments, the determined soil levelness of the field may correspond to any suitable parameter(s)/value(s).

In several embodiments, at (208), the method 200 may include determining the amplitude of the transformed data at a frequency corresponding to the lateral spacing of shanks 46. As described above, after the implement 10 has been moved across the field, ridges may be present at the locations where the shanks 46 were moved through the soil. As such, the peaks of these ridges may have the same lateral spacing as the shanks 46. In this respect, the amplitude of the transformed vision data at the frequency corresponding to the lateral spacing of the shanks 46 may provide the average height or depth of the vertical profile of the soil surface at the locations where the shanks 46 were moved through the soil. For instance, in the data plot shown in FIG. 5, peak 148 of the line 130 may correspond to the amplitude of the transformed vision data at the frequency corresponding the lateral spacing of the shanks 46.

In addition, at (208), the method 200 may further include determining the phase of the transformed data at the frequency corresponding to the lateral spacing of shanks 46. In general, the determined amplitude value may be a magnitude value. As such, the determined amplitude may not provide an indication of whether ridges or valleys are present at the locations where the shanks 46 were moved through the soil. In this regard, the phase of the transformed data at the frequency corresponding the lateral spacing of the shanks 46 may provide an indication of whether the determined amplitude value is the height of a ridge or the depth of a valley. For example, in one embodiment, a phase of zero degrees (or substantially zero degrees) may indicate that the determined amplitude value is the height of a ridge. Conversely, in such an embodiment, a phase of 180 degrees (or substantially 180 degrees) may indicate that the determined amplitude value is the depth of a valley.

Moreover, at (210), the method 200 may include providing a notification to the operator of at least one of the work vehicle or the agricultural implement associated with the determined soil levelness. Specifically, the controller 102 may configured to transmit instructions to the user interface 144 (e.g., the communicative link 146). Such instructions may, in turn, instruct the user interface 144 to provide a notification to the operator of the vehicle/implement 10/12 (e.g., by causing a visual or audible notification or indicator to be presented to the operator) that provides an indication that determined soil levelness of the field (e.g., the height of the ridges or depth of the valleys present at the locations where the shanks 46 engaged the soil). In several embodiments, the soil levelness indication may be in the spatial domain and/or the frequency domain. For example, in one embodiment, the user interface 144 may display a plot or visual image of the soil profile (in the spatial domain) of the field behind the shanks 46 based on an average of twenty to fifty data scan lines. Moreover, in such an embodiment, the user interface 144 may display a plot (e.g., a sinewave plot) of the transformed data at the frequency corresponding to the lateral spacing of shanks 46 superimposed onto the plot of the soil profile in the spatial domain. In addition, the user interface 144 may display the numerical value of the ridge/valley peak-to-peak height. However, in alternative embodiments, the user interface 144 may be configured to display any other suitable soil levelness indication. The operator may, in turn, then choose to initiate any suitable corrective action he/she believes is necessary to adjust the soil levelness (to the extent such control action(s) is necessary), such as adjusting the position of and/or force being applied to the leveling blades 52.

Furthermore, at (212), the method 200 may include actively adjusting an operating parameter of at least one of the work vehicle and/or the agricultural implement based on the determined soil levelness of the field. Specifically, in several embodiments, the control module 132 of the controller 102 may be configured to adjust one or more operating parameters of the vehicle 10 and/or the implement 12, such as ground speed of the vehicle/implement 10/12 and or the force(s) applied to the ground-engaging tool(s) (e.g., the leveling blades 52) of the implement 12, in a manner that adjusts the soil levelness of the field (e.g., the heights of the ridges and/or the depths of the valleys within the field). For example, in one embodiment, the controller 102 may be configured to compare the determined soil levelness to a predetermined soil levelness range. Thereafter, when the determined soil levelness falls outside of the predetermined soil levelness range (thereby indicating that the ridges are too high or too low and/or the valleys are too shallow or too deep), the control module 132 may be configured to adjust the operating parameter(s) of the vehicle 10 and/or the implement 12 in a manner that adjusts the soil levelness of the field.

In several embodiments, at (212), the method 200 may include actively adjusting the position of and/or force being applied to the leveling blades 52. More specifically, as described above, the leveling blades 52 are staggered between the shanks 46 in the lateral direction 47 of the implement 10 such that the leveling blades 52 flatten the ridges and fill in the valleys left after the shanks 46 have been moved through the soil. For example, when it is determined that the ridges present at the locations where the shanks 46 were moved through the soil are too high, the control module 132 may be configured to control the valve(s) 134 in a manner that decreases the penetration depth of and/or the force applied to the leveling blades 52 by the actuators 60. Conversely, when it is determined that the ridges present at the locations where the shanks 46 where moved through the soil are too low (or valleys are present), the control module 132 may be configured to control the valve(s) 134 in a manner that increases the penetration depth of and/or the force applied to the leveling blades 52 by the actuators 60.

In one embodiment, (208)-(212) of the method 200 may be performed iteratively for each successive individual data scan line received from the vision-based sensor(s) 104. In other embodiments, (208)-(212) of the method 200 may be performed for a group of data scan lines. For example, as mentioned above, in several embodiments, the vision data analysis module 126 of the controller 102 may be configured to average a plurality of successive data scan lines (e.g., twenty to fifty successive data scan lines) together to form an average data scan line. Thereafter, the controller 102 may be configured to perform (208)-(212) of the method 200 for the average data scan line. In such embodiment, (208)-(212) of the method 200 may be performed iteratively for each successive average data scan line.

It is to be understood that the steps of the method 200 are performed by the controller 102 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 102 described herein, such as the method 200, is implemented in software code or instructions which are tangibly stored on a tangible computer readable medium. The controller 102 loads the software code or instructions via a direct interface with the computer readable medium or via a wired and/or wireless network. Upon loading and executing such software code or instructions by the controller 102, the controller 102 may perform any of the functionality of the controller 102 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for determining soil levelness as an agricultural implement is being towed across a field by a work vehicle, the system comprising:
   a vision-based sensor provided in operative association with one of the work vehicle or the agricultural implement such that the vision-based sensor is configured to capture vision data associated with a portion of the field present within a field of view of the vision-based sensor; and
   a controller communicatively coupled to the vision-based sensor, the controller including a processor and associated memory, the memory storing instructions that, when implemented by the processor, configure the controller to:
      receive, from the vision-based sensor, the vision data associated with the portion of the field present within the field of view of the vision-based sensor, the vision data being in a spatial domain;
      transform the vision data from the spatial domain to a frequency domain using a spectral analysis; and
      determine a soil levelness of the portion of the field present within the field of view of the vision-based sensor based on the transformed vision data in the frequency domain.

2. The system of claim 1, wherein, when determining the soil levelness, the controller is further configured to determine an amplitude of the transformed vision data in the frequency domain at a frequency corresponding to a lateral spacing of a plurality of ground engaging tools mounted on the agricultural implement.

3. The system of claim 2, wherein, when determining the soil levelness, the controller is further configured to determine a phase of the transformed vision data in the frequency domain at the frequency corresponding to the lateral spacing of the plurality of ground engaging tools.

4. The system of claim 1, wherein the spectral analysis comprises a Fourier transformation.

5. The system of claim 1, wherein the controller is further configured to provide a notification to an operator of at least one of the work vehicle or the agricultural implement associated with the determined soil levelness of the field.

6. The system of claim 1, wherein the controller is further configured to actively adjust an operating parameter of at least one of the work vehicle or the agricultural implement based on the determined soil levelness of the field.

7. The system of claim 6, wherein, when actively adjusting the operating parameter, the controller is configured to:
   compare the determined soil levelness to a predetermined soil levelness range; and when the determined soil levelness falls outside of the predetermined soil levelness range, actively adjust the operating parameter.

8. The system of claim 6, wherein the operating parameter comprises at least of a ground speed of the work vehicle or a force being applied to a ground-engaging tool of the implement.

9. The system of claim 1, wherein the vision-based sensor comprises a LIDAR sensor.

10. An agricultural implement, comprising:
    a frame;
    a plurality of first ground engaging tools mounted on the frame;

a plurality of second ground engaging tool mounted on the frame aft of the plurality of first ground engaging tools relative to a direction of travel of the agricultural implement;

a vision-based sensor mounted on the frame such that the vision-based sensor is configured to capture vision data associated with a portion of the field present within a field of view of the vision-based sensor; and a controller communicatively coupled to the vision-based sensor, the controller including a processor and associated memory, the memory storing instructions that, when implemented by the processor, configure the controller to:

receive, from the vision-based sensor, the vision data associated with the portion of the field present within the field of view of the vision-based sensor, the vision data being in a spatial domain;

transform the vision data from the spatial domain to a frequency domain using a spectral analysis;

determine a soil levelness of the portion of the field present within the field of view of the vision-based sensor based on the transformed vision data in the frequency domain; and actively adjust a force being applied to the plurality of second ground engaging tools based on the determined soil levelness.

11. The agricultural implement of claim 10, wherein, when determining the soil levelness, the controller is further configured to determine an amplitude of the transformed vision data in the frequency domain at a frequency corresponding to a lateral spacing of the plurality of first ground engaging tools.

12. The agricultural implement of claim 10, wherein the spectral analysis comprises a Fourier transformation.

13. The agricultural implement of claim 10, wherein the vision-based sensor is installed on the frame such that the field of view of the vision-based sensor is directed towards a portion of the field aft of the agricultural implement relative to the direction of travel.

14. A method for determining soil levelness as an agricultural implement is being towed across a field by a work vehicle, the method comprising:

receiving, with one or more computing devices, vision data associated with a portion of the field as the agricultural implement is being towed across the field by a work vehicle, the vision data being in a spatial domain;

transforming, with the one or more computing devices, the vision data from the spatial domain to a frequency domain using a spectral analysis;

determining, with the one or more computing devices, a soil levelness of the portion of the field based on the transformed vision data in the frequency domain; and providing, with the one or more computing devices, a notification to an operator of at least one of the work vehicle or the agricultural implement associated with the determined soil levelness of the field.

15. The method of claim 14, wherein determining the soil levelness comprises determining, with the one or more computing devices, an amplitude of the transformed vision data in the frequency domain at a frequency corresponding to a lateral spacing of a plurality of ground engaging tools mounted on the agricultural implement.

16. The method of claim 15, wherein determining the soil levelness comprises determining, with the one or more computing devices, a phase of the transformed vision data in the frequency domain at the frequency corresponding to the lateral spacing of the plurality of ground engaging tools.

17. The method of claim 14, wherein the spectral analysis comprises a Fourier transformation.

18. The method of claim 17, wherein the operating parameter comprises at least of a ground speed of the work vehicle or a force being applied to a ground-engaging tool of the implement.

19. The method of claim 14, further comprising:

actively adjusting, with the one or more computing devices, an operating parameter of at least one of the work vehicle or the agricultural implement based on the determined soil levelness of the field.

20. The method of claim 19, wherein actively adjusting the operating parameter comprises:

comparing, with the one or more computing devices, the determined soil levelness to a predetermined soil levelness range; and when the determined soil levelness falls outside of the predetermined soil levelness range, actively adjusting, with the one or more computing devices, the operating parameter.

* * * * *